United States Patent [19]
Afanador

[11] Patent Number: 6,167,041
[45] Date of Patent: Dec. 26, 2000

[54] SWITCH WITH FLEXIBLE LINK LIST MANAGER FOR HANDLING ATM AND STM TRAFFIC

[76] Inventor: J. Abraham Afanador, P.O. Box 1332, Allen, Tex. 75002

[21] Appl. No.: 09/040,080

[22] Filed: Mar. 17, 1998

[51] Int. Cl.[7] .................................................. H04L 12/64
[52] U.S. Cl. ........................................... 370/353; 370/352
[58] Field of Search ..................................... 370/352, 353, 370/356, 389, 390, 395, 412, 413, 414, 419

[56] References Cited

U.S. PATENT DOCUMENTS

| | | | |
|---|---|---|---|
| 4,603,416 | 7/1986 | Servel et al. | 370/60 |
| 4,922,487 | 5/1990 | Eilenberger et al. | 370/411 |
| 4,926,416 | 5/1990 | Weik | 370/60 |
| 5,144,619 | 9/1992 | Munter | 370/60 |
| 5,173,901 | 12/1992 | DeSomer | 370/112 |
| 5,251,206 | 10/1993 | Calvignac | 370/60 |
| 5,341,376 | 8/1994 | Yamashita | 370/99 |
| 5,359,600 | 10/1994 | Ueda et al. | 370/60 |
| 5,386,417 | 1/1995 | Daugherty | 370/54 |
| 5,390,175 | 2/1995 | Hiller et al. | 370/398 |
| 5,390,184 | 2/1995 | Morris | 370/94 |
| 5,521,916 | 5/1996 | Choudhury et al. | 370/414 |
| 5,568,486 | 10/1996 | Huscroft et al. | 370/94 |
| 5,570,355 | 10/1996 | Dail et al. | 370/60 |
| 5,577,037 | 11/1996 | Takatori et al. | 370/60 |
| 5,623,491 | 4/1997 | Skoog | 370/397 |
| 5,805,588 | 9/1998 | Petersen | 370/350 |
| 5,828,653 | 10/1998 | Goss | 370/230 |
| 5,862,136 | 1/1999 | Irwin | 370/395 |
| 5,917,824 | 6/1999 | Brueckheimer et al. | 370/397 |
| 5,987,025 | 11/1999 | Horaki | 370/352 |

*Primary Examiner*—Hassan Kizou
*Assistant Examiner*—Ahmed Elallam
*Attorney, Agent, or Firm*—Dennis T. Griggs

[57] ABSTRACT

A telecommunication switch for handling both synchronous transfer mode (STM) digital data signals and asynchronous transfer mode (ATM) digital data signals includes a flexible link list manager for mapping input slots to output slots, an input hybrid page, an output hybrid page and a hybrid routing table for managing the time slot interchange function. The STM data stream is segmented to form fixed length, serially propagating digital data words. The segment length of each STM data word is equal to the ATM cell length. The number of bytes in each STM segment and the number of bytes in each ATM cell are the same, and the STM segments and ATM cells are equal in duration. Because the ATM and STM signals are routed through a common switch, it is not necessary to split the two types of traffic before switching can be performed. Consequently, the switch can support any network distribution of ATM and STM traffic with the same switching equipment.

14 Claims, 15 Drawing Sheets

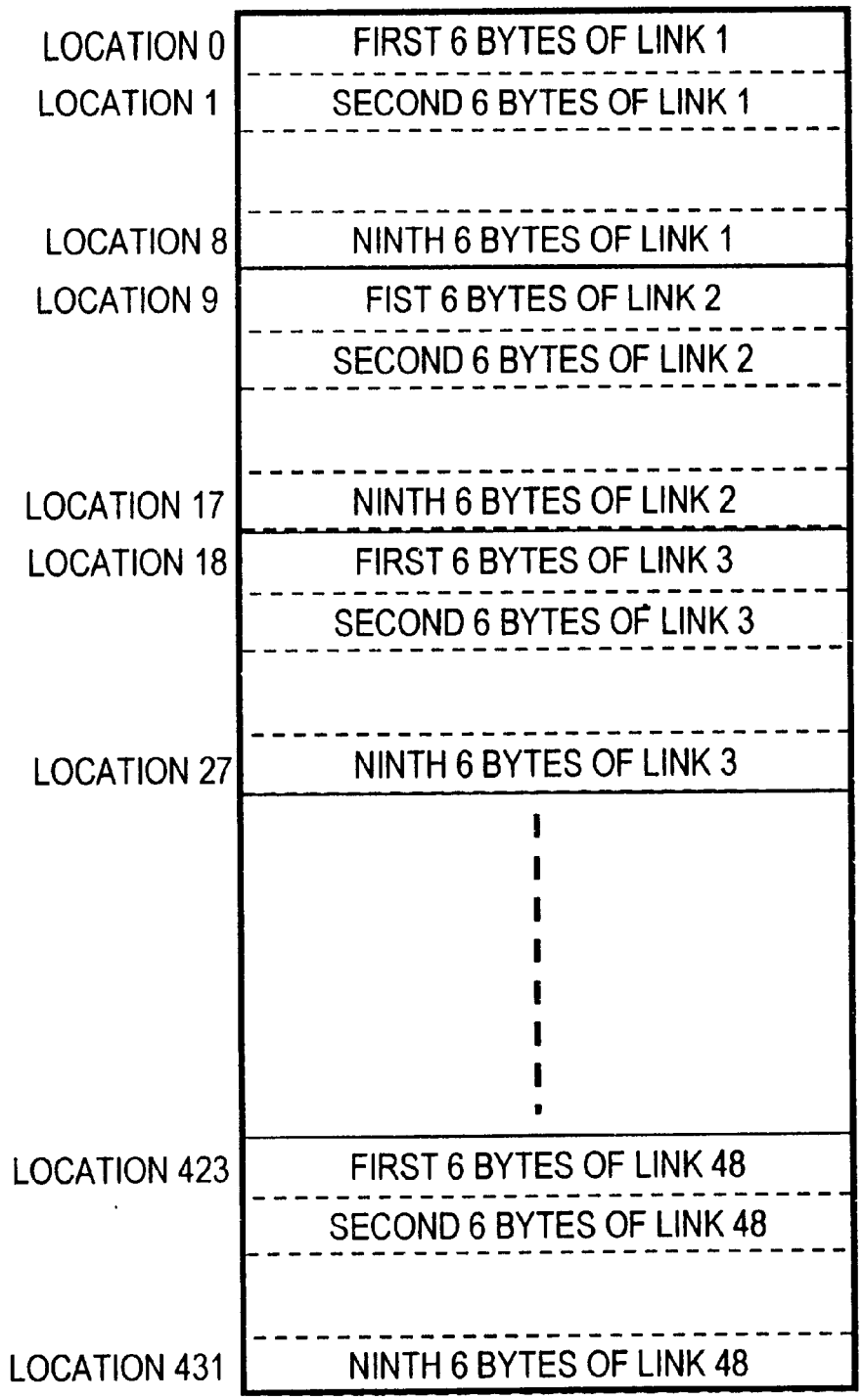
FIG. 9  ORGANIZATION OF INPUT HYBRID PAGE

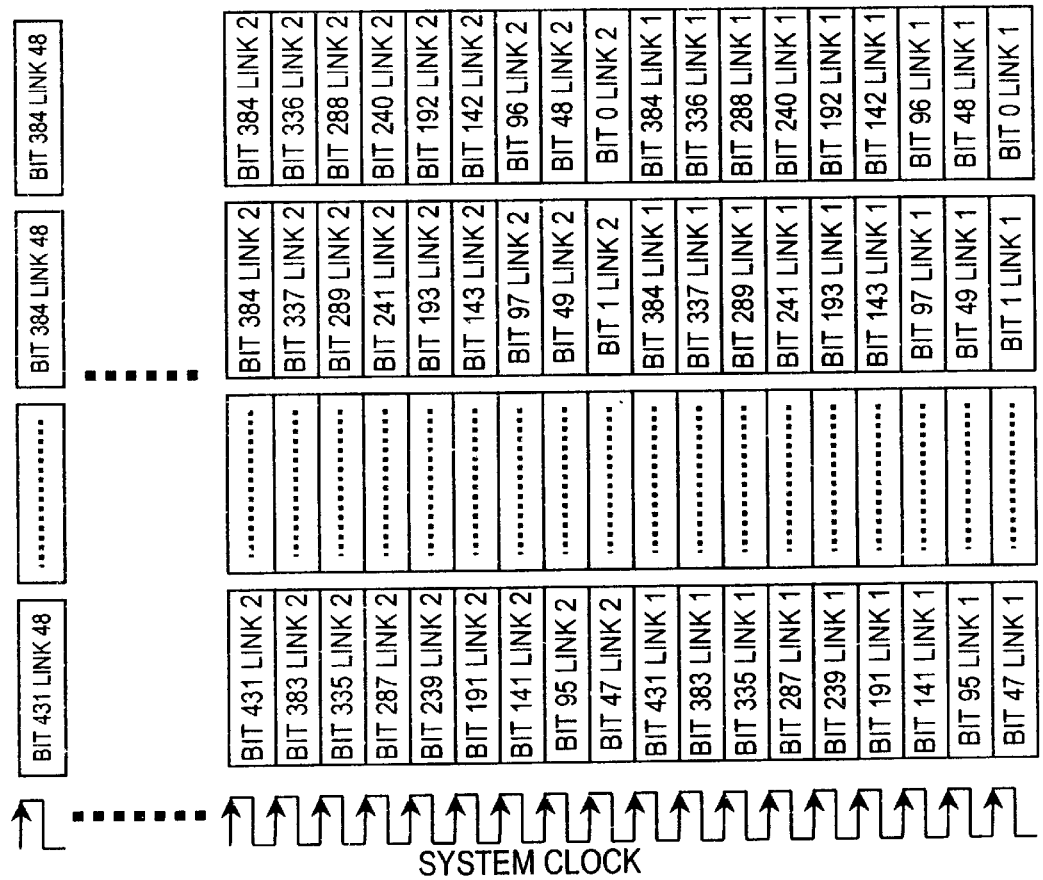
FIG. 10 DATA FORMAT LEAVING THE INPUT HYBRID PAGE

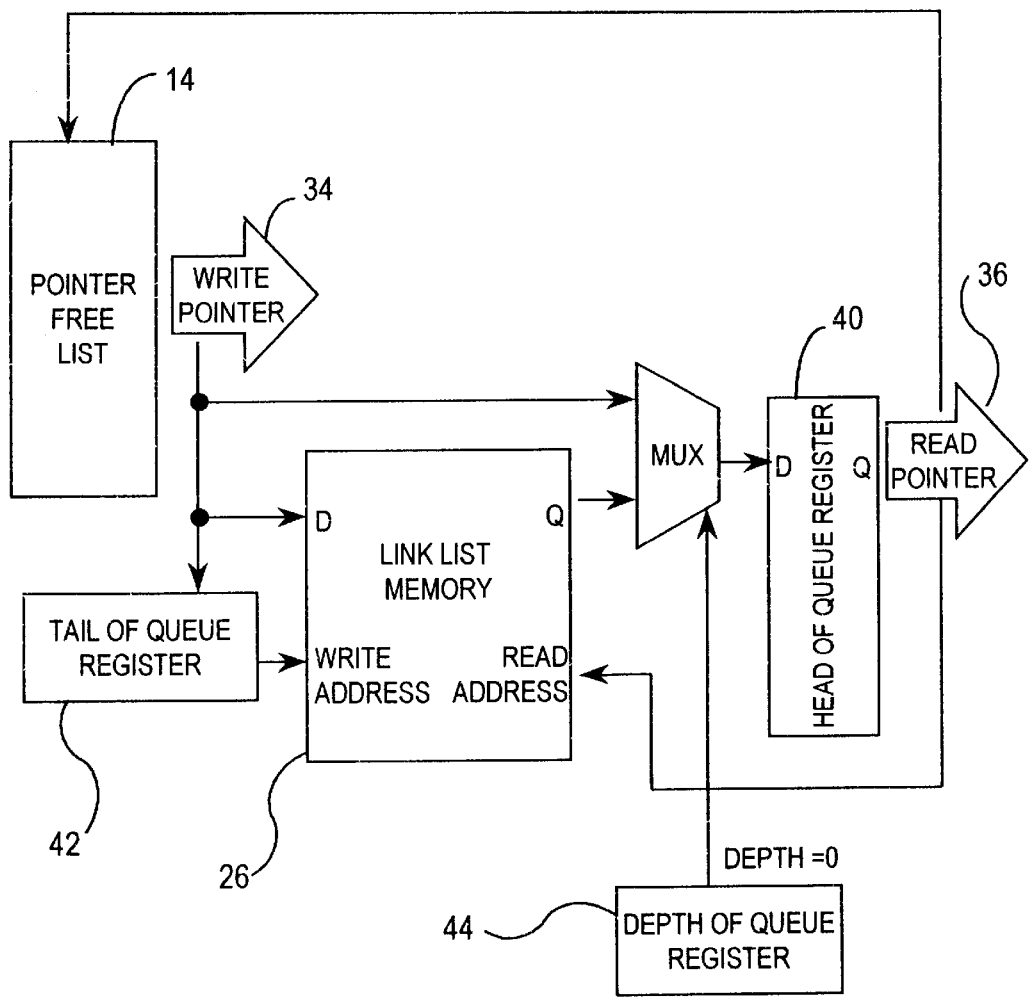
FIG. 11 LINK LIST LOGIC

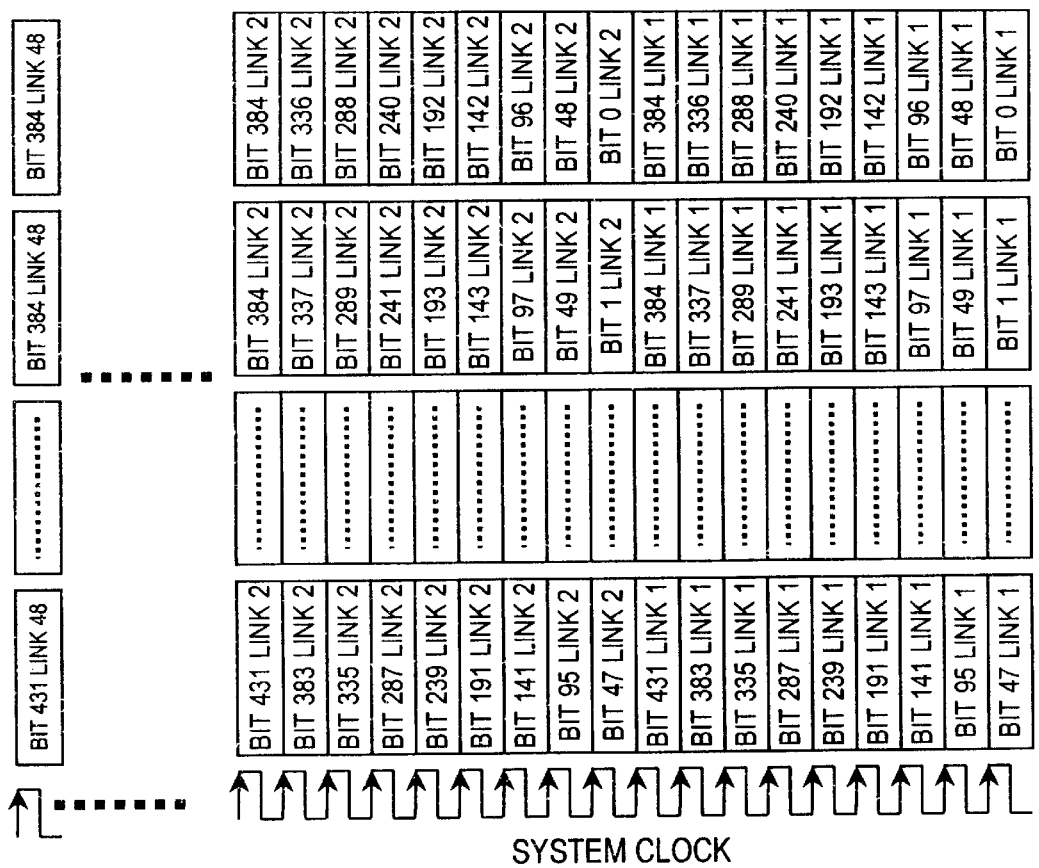
FIG. 12 DATA FORMAT ENTERING THE OUTPUT HYBRID PAGE

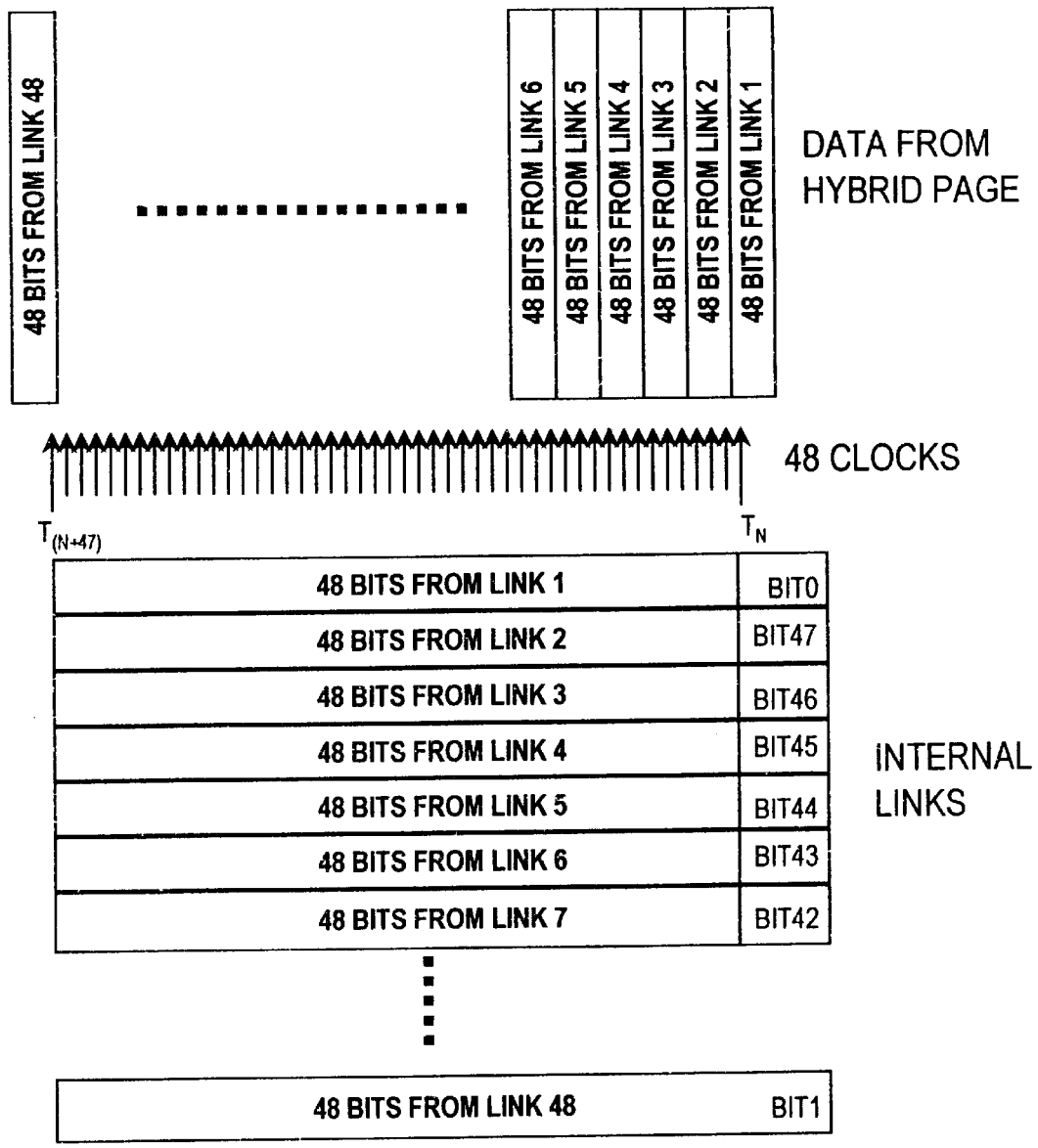
FIG. 13  PARALLEL TO SERIAL CONVERSION IN THE OUTPUT HYBRID PAGE

| 9 BYTES OF LINK 2 | 9 BYTES OF LINK 1 |
|---|---|
| 9 BYTES OF LINK 2 | 9 BYTES OF LINK 1 |
| 9 BYTES OF LINK 2 | 9 BYTES OF LINK 1 |
| 9 BYTES OF LINK 2 | 9 BYTES OF LINK 1 |
| 9 BYTES OF LINK 2 | 9 BYTES OF LINK 1 |
| 9 BYTES OF LINK 2 | 9 BYTES OF LINK 1 |
| SPARE | SPARE |

FIG. 14  DATA FROM INPUT HYBRID PAGE

| SPARE | 9 BYTES OF LINK 2 | 9 BYTES OF LINK 2 | 9 BYTES OF LINK 2 | 9 BYTES OF LINK 2 | 9 BYTES OF LINK 2 | 9 BYTES OF LINK 2 | SPARE | 9 BYTES OF LINK 1 | 9 BYTES OF LINK 1 | 9 BYTES OF LINK 1 | 9 BYTES OF LINK 1 | 9 BYTES OF LINK 1 | 9 BYTES OF LINK 1 |

FIG. 15  DATA OUT OF THE HYBRID PAGE COMBINER

FIG. 16

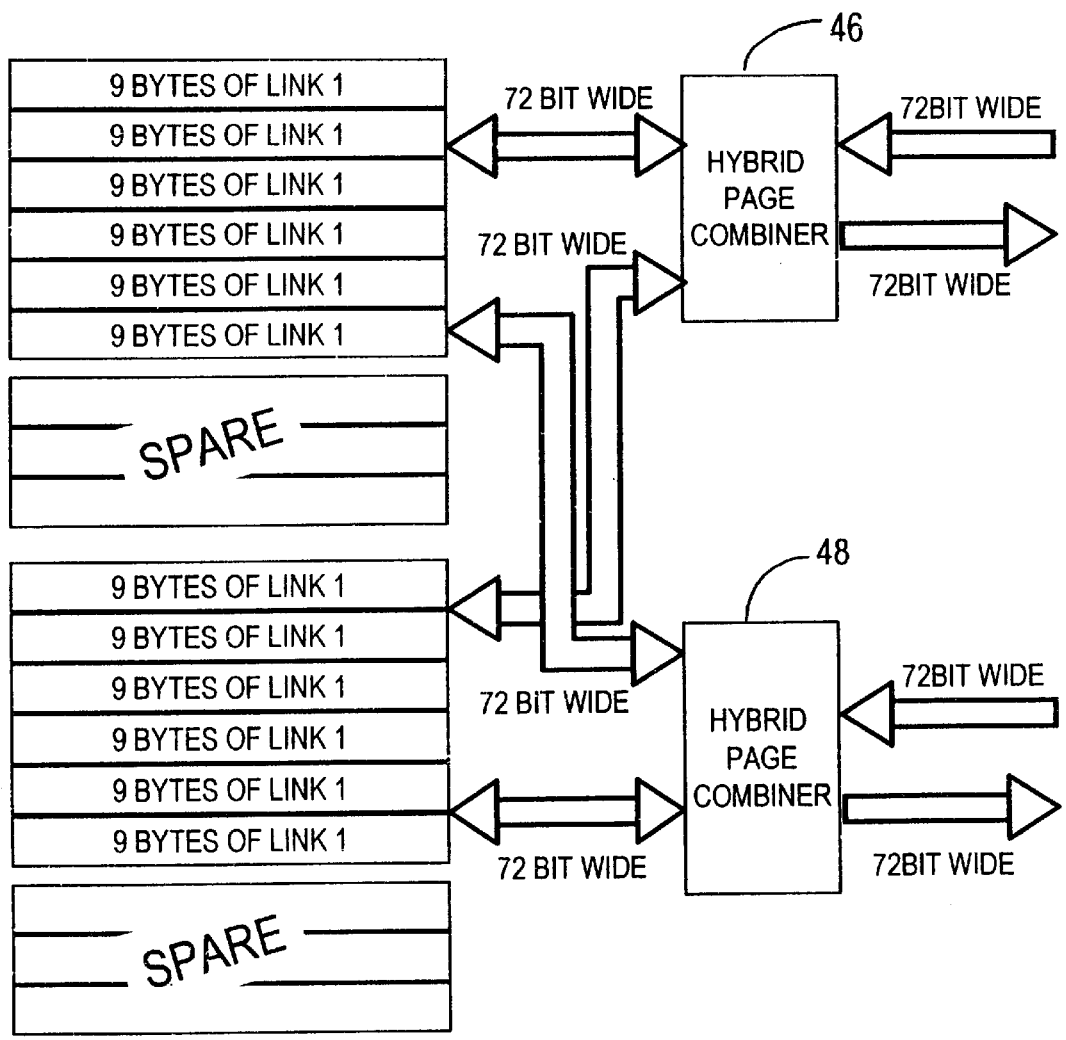
FIG. 17  HYBRID PAGE COMBINERS FOR DOUBLE THROUGHPUT

| | |
|---|---|
| 9 BYTES OF LINK 3 | 9 BYTES OF LINK 1 |
| 9 BYTES OF LINK 3 | 9 BYTES OF LINK 1 |
| 9 BYTES OF LINK 3 | 9 BYTES OF LINK 1 |
| 9 BYTES OF LINK 4 | 9 BYTES OF LINK 2 |
| 9 BYTES OF LINK 4 | 9 BYTES OF LINK 2 |
| 9 BYTES OF LINK 4 | 9 BYTES OF LINK 2 |
| SPARE | SPARE |
| | |
FIG. 18  DATA INTO THE HYBRID PAGE COMBINER
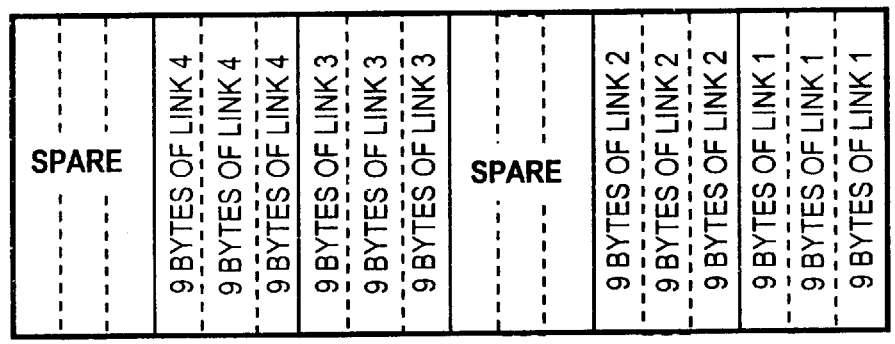
FIG. 19  DATA OUT OF THE HYBRID PAGE COMBINER AND INTO THE DATA BUFFER
FIG. 20

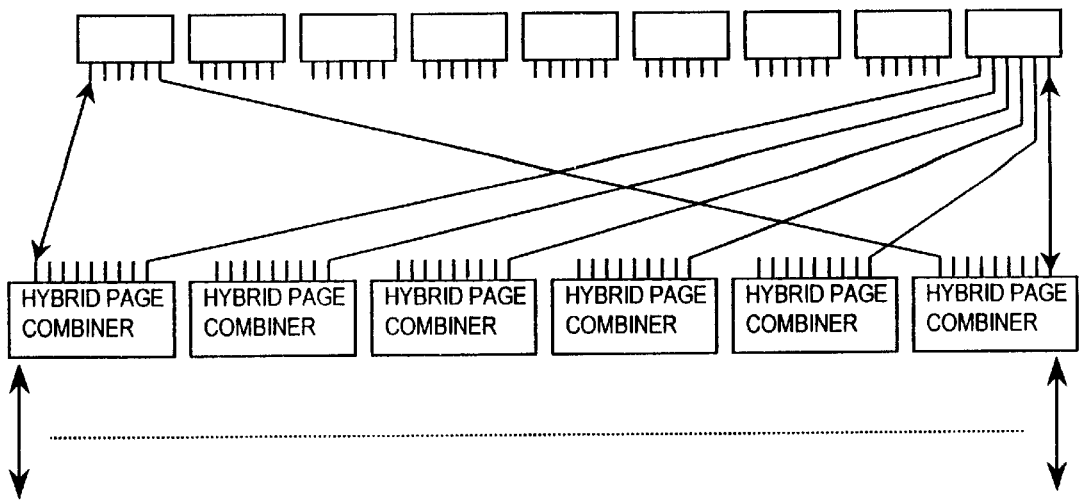
FIG. 21  9 HYBRID PAGE BLOCKS
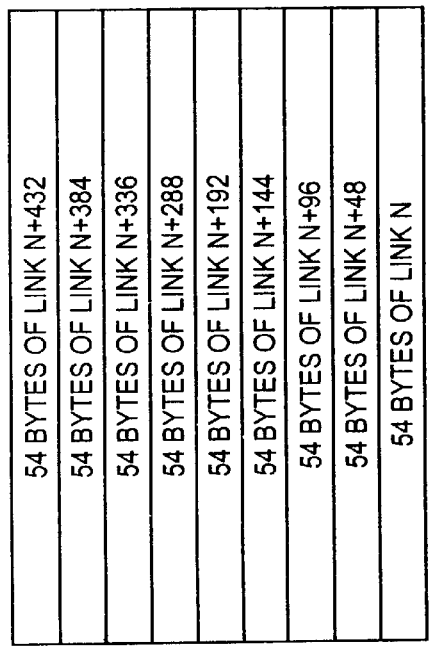
FIG. 22  DATA IN AND OUT OF THE DATA BUFFERS
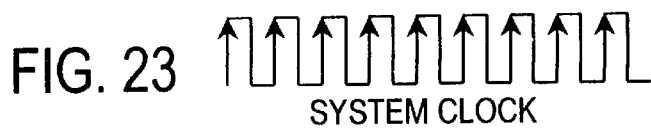
FIG. 23  SYSTEM CLOCK

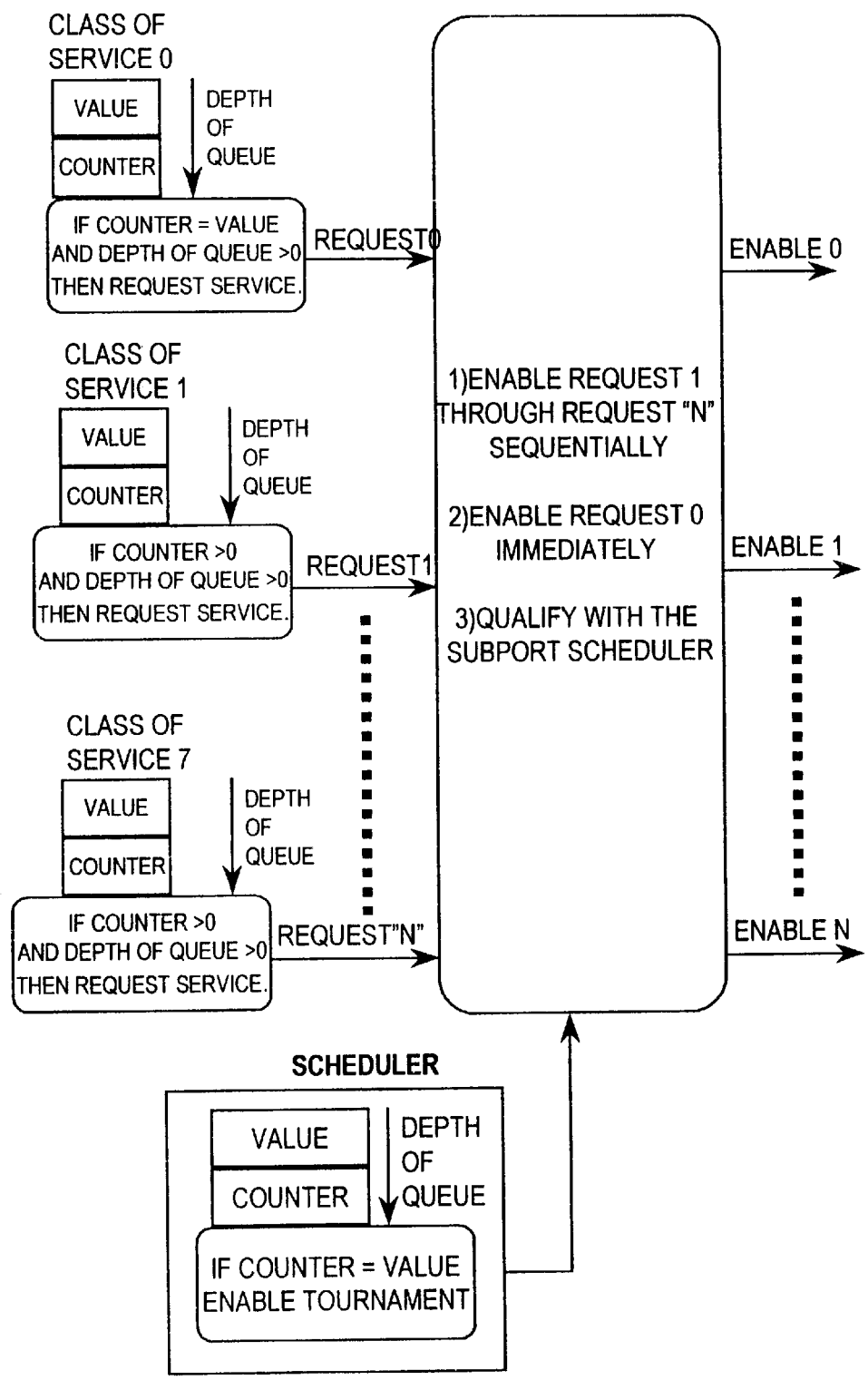
FIG. 24 PRIORITY TOURNAMENT

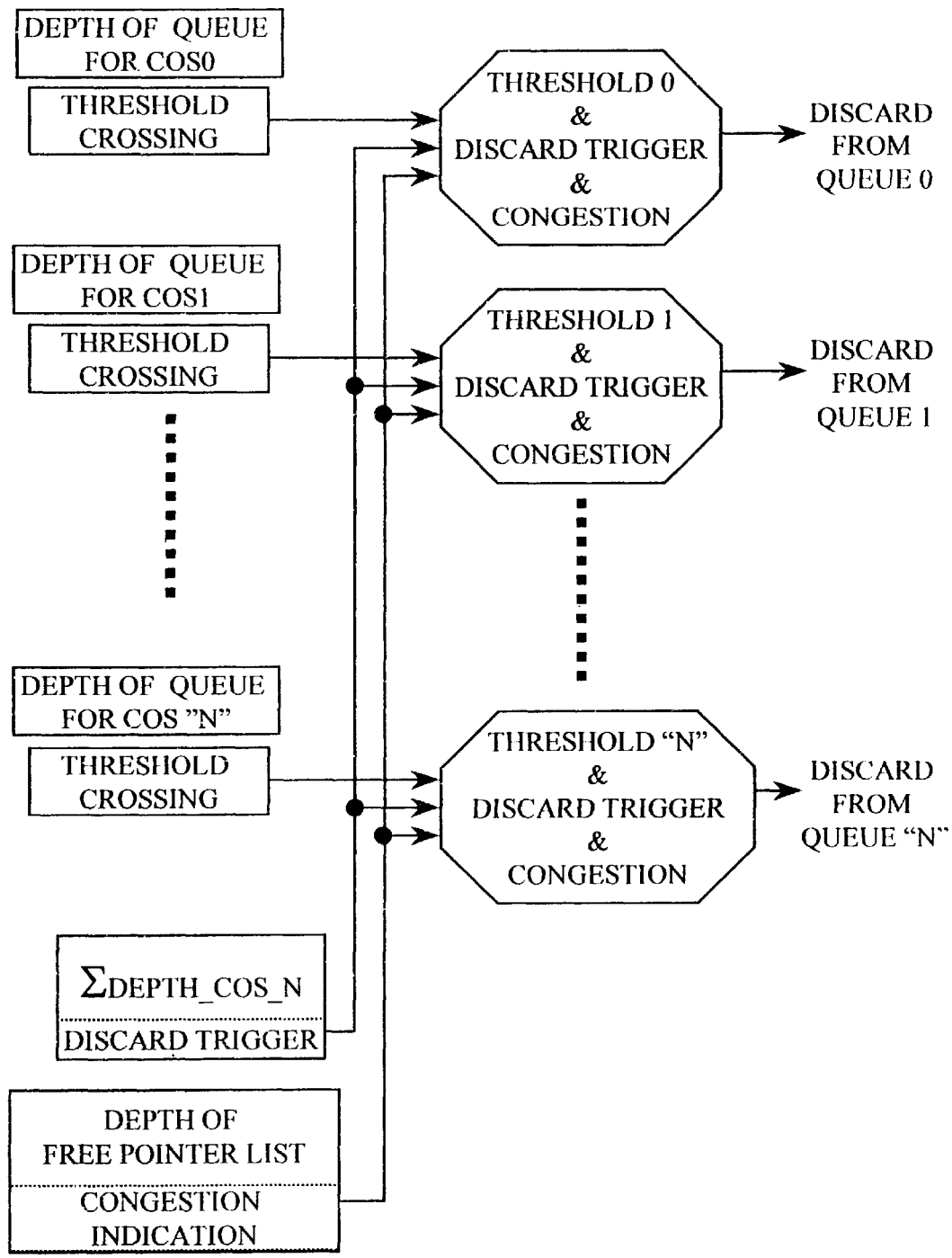
FIG. 25 CELL DISCARD LOGIC

SWITCH WITH FLEXIBLE LINK LIST MANAGER FOR HANDLING ATM AND STM TRAFFIC

BACKGROUND OF THE INVENTION

This invention relates generally to telecommunication transmission networks and in particular to a switch capable of handling synchronous transfer mode (STM) as well as asynchronous transfer mode (ATM) traffic.

In telephone networks, synchronous transfer mode switching establishes a circuit connection for the calling and the called party to exchange information for the complete duration of the connection. Each circuit has a fixed bandwidth. Several circuits can be multiplexed onto a link, and switching is performed by translating the incoming circuit address to the outgoing circuit address. Before the data can flow from the input circuit to the output circuit, a mapping of the incoming address to the outgoing address must be established. Once a connection is established, its bandwidth cannot be used by any other connection, whether there is any traffic flowing or not. For instance, once a voice connection is established, a bandwidth of 64 kilobits per second is allocated to each party, for the duration of the connection. When one of the parties is listening to the other party, the listening party does not generate any traffic. Although the bandwidth is not used during such silent periods, it cannot be used to transfer any other traffic.

Synchronous transfer mode network technology minimizes the end-to-end delay of the connection. There is no need for data buffers since output contention never occurs. However, it is not an efficient way to support variable bit rate traffic since each circuit has a fixed bandwidth. Asynchronous transfer mode (ATM) network technology is a more efficient form for transporting variable bit rate traffic. The increased demand for variable bit rate services has led to a network shared by both types of traffic.

Asynchronous transfer mode switching transports cells from an input port to an output port based on the information carried in the cell header and a switch routing table. An ATM connection is established by setting up the routing table such that an association is established between an output port and the connection identifiers carried in the cell. The connection identifiers are the virtual path identifier (VPI) and the virtual channel identifier (VCI).

Contention resolution and buffering of contending cells are basic functions of an ATM switch. In ATM connections, no attempt is made to find a time slot that is mutually convenient to the input port and the output port. Thus, output contention will occur among cells arriving simultaneously for the same destination, and buffering must be provided for the contending cells since discarding the cells is not acceptable.

Given the present use of telecommunication transmission networks on which constant bit rate traffic transported as STM and variable bit rate traffic carried as ATM are present in the network simultaneously, there is a need for a technique to accommodate both types of traffic in a single switching element that offers STM switching for the STM traffic and ATM switching for the ATM traffic.

Some switching arrangements for handling dual mode traffic have been proposed. For example, U.S. Pat. No. 5,390,184 discloses an ATM switch that includes an ATM scheduler for ATM service, an STM scheduler for STM service and a selection circuit for determining STM/ATM scheduling priority. STM traffic is given priority over ATM traffic.

U.S. Pat. No. 5,577,037 discloses a switching unit that is operable to switch STM signals (which have been packetized) and ATM signals. The available time slots in input and output highways are determined, and the STM signals are stored in a data memory at addresses that correspond with the previously secured time slots. When storing an STM signal in the data memory, the address in which the STM signal is to be stored is read out from the previously stored address information, and the STM signal is stored in the data memory at the corresponding address. The processing for ATM signals is performed in a similar fashion, with the unused portion of the memory being allocated for processing ATM signals.

U.S. Pat. No. 5,570,355 discloses a data transmission network for handling STM traffic and ATM traffic which includes a circuit for dynamically adjusting the location and size of STM/ATM memory region boundaries.

U.S. Pat. No. 5,144,619 discloses a common memory switch for routing ATM cells and STM words in which STM words are accumulated and are combined with a header to form a switch cell. The cells are queued along with the address for each switch cell and are stored in memory. Switch cells are then transmitted to an outgoing channel corresponding to an address indicative of the incoming channel from which the presented cell originates.

BRIEF SUMMARY OF THE INVENTION

The present invention provides a common telecommunication switch for routing both STM and ATM traffic, and thus substantially simplifies the management of constant bit rate traffic and variable bit rate traffic in a dual mode telecommunication transport network. The common switch eliminates the need for separate switching equipments (one for ATM traffic and one for STM traffic) which is the prevalent implementation in the prior art.

According to one aspect of the invention, a telecommunications switch for handling both synchronous transfer mode (STM) digital data signals and asynchronous transfer mode (ATM) digital data signals includes a flexible link list manager for mapping input slots to output slots, an input hybrid page, an output hybrid page and a hybrid routing table for managing the time slot interchange function. The STM data stream is segmented to form fixed length, serially propagating digital data segments. The time frame length of each STM data segment is equal to the ATM cell length. The number of bytes in each STM segment and the number of bytes in each ATM cell are the same, and the STM segments and ATM cells are equal in duration. Each byte of each STM segment contains eight bits and each byte of each ATM cell contains eight bits. Consequently, the ATM cells as well as the STM segments are processed synchronously and mapped to output ports with reference to port address information stored in a common programmable memory (the hybrid routing table).

For STM data, the destination port is determined by connection data stored in the hybrid routing table. STM data are mapped to non-contentious output ports of queue depth one. ATM data are mapped according to virtual path identifier (VPI) and virtual channel identifier (VCI) data contained in each ATM cell and mapping information stored in the hybrid routing table. After mapping, the ATM data are output in queues based on the output port and class of service. Although the ATM cells are propagated asynchronously in the serial domain outside of the switch, the ATM cells are processed synchronously along with the STM segments in the parallel domain within the switch. According to this arrangement, a single switch can support any network distribution of STM and ATM traffic.

The bandwidth for this common switch connection is fixed and the delay through the switch is constant. It is non-blocking and offers unlimited multicasting of traffic to more than one port. The input hybrid page and output hybrid page provide the data RAM for the time slot interchange function, and the hybrid routing table provides the control RAM for the time slot interchange function. The flexible link list manager manages multiple data streams on multiple input links, where equal segments of each input data stream are routed according to information stored in a hybrid routing table. STM segments are switched synchronously from a buffer queue of depth one, and ATM cells are buffered in queues and are output according to a class of service priority arrangement. Both STM and ATM traffic share the same connection map (the hybrid routing table).

Associated with each input port is at least one entry in the hybrid routing table where STM switching is specified as well as an output port. The link list manager links the input data to a queue associated with the output ports. For synchronous traffic, output ports are queues of depth one since output contention is not an issue for STM switching. ATM switching uses the VPI/VCI number in each cell and the information stored in the hybrid routing table to map cells from the input to the output. Contending ATM cells are processed in a queue by the link list manager. The link list manager creates queues based on the output port and the class of service. Unlimited multicasting for ATM traffic is supported in the same way as it is for STM traffic, by linking cells to multiple output queues.

The apparatus and method of the present invention provides certain advantages over conventional switching implementations. One advantage is the use of a common switch for routing ATM and STM traffic which eliminates the need of splitting the two types of traffic before switching can be performed. Another technical advantage is the elimination of two types of switching equipment. Yet another advantage is the ability to support any network distribution of ATM and STM traffic with the same switching equipment. Still another advantage is that STM data is not subjected to packetizing and re-assembly in order to be switched, thus eliminating clock jitter that can cause data to become corrupted or lost.

BRIEF DESCRIPTION OF THE DRAWING

The accompanying drawing is incorporated into and forms a part of the specification to illustrate the preferred embodiments of the present invention. Throughout the drawing, like reference numerals designate corresponding elements. This drawing, together with the description, serves to explain the principles of the invention and is only for the purpose of illustrating exemplary embodiments showing how the invention can best be made and used. The drawing should not be construed as limiting the invention to the illustrated and described embodiments. Various advantages and features of the invention will be understood from the following detailed description taken in connection with the appended claims and with reference to the attached drawing figures in which:

FIG. 9 is a block diagram which illustrates the data organization of a hybrid page;

FIG. 10 is a block diagram which illustrates the format of data leaving the hybrid page;

FIG. 11 is a block diagram which illustrates a portion of the flexible link list manager;

FIG. 12 is a block diagram which illustrates the format of data entering the output hybrid page;

FIG. 13 is a block diagram which illustrates parallel-to-serial conversion in the output hybrid page;

FIG. 14 is a block diagram which illustrates the organization of data processed by the input hybrid page;

FIG. 15 is a timing diagram;

FIG. 16 is a block diagram which illustrates the processing of data output from the hybrid page combiner of FIG. 17;

FIG. 17 is a block diagram of a hybrid page combiner having double throughput;

FIG. 18 is a block diagram which illustrates the flow of data into the hybrid page combiner;

FIG. 19 is a block diagram which illustrates the flow of data out of the hybrid page combiner;

FIG. 20 is a timing diagram which serves as a reference for the flow of data out of the hybrid page combiner;

FIG. 21 is a block diagram showing the interconnection of hybrid page blocks;

FIG. 22 is a block diagram showing the flow of data in and out of data buffers;

FIG. 23 is the system clock timing diagram which controls data flow of FIG. 22;

FIG. 24 is a block diagram which illustrates resolution of contending ATM signals in a priority tournament; and, FIG. 25 is a block diagram which illustrates cell discard logic.

DETAILED DESCRIPTION OF THE INVENTION

Figure 1:
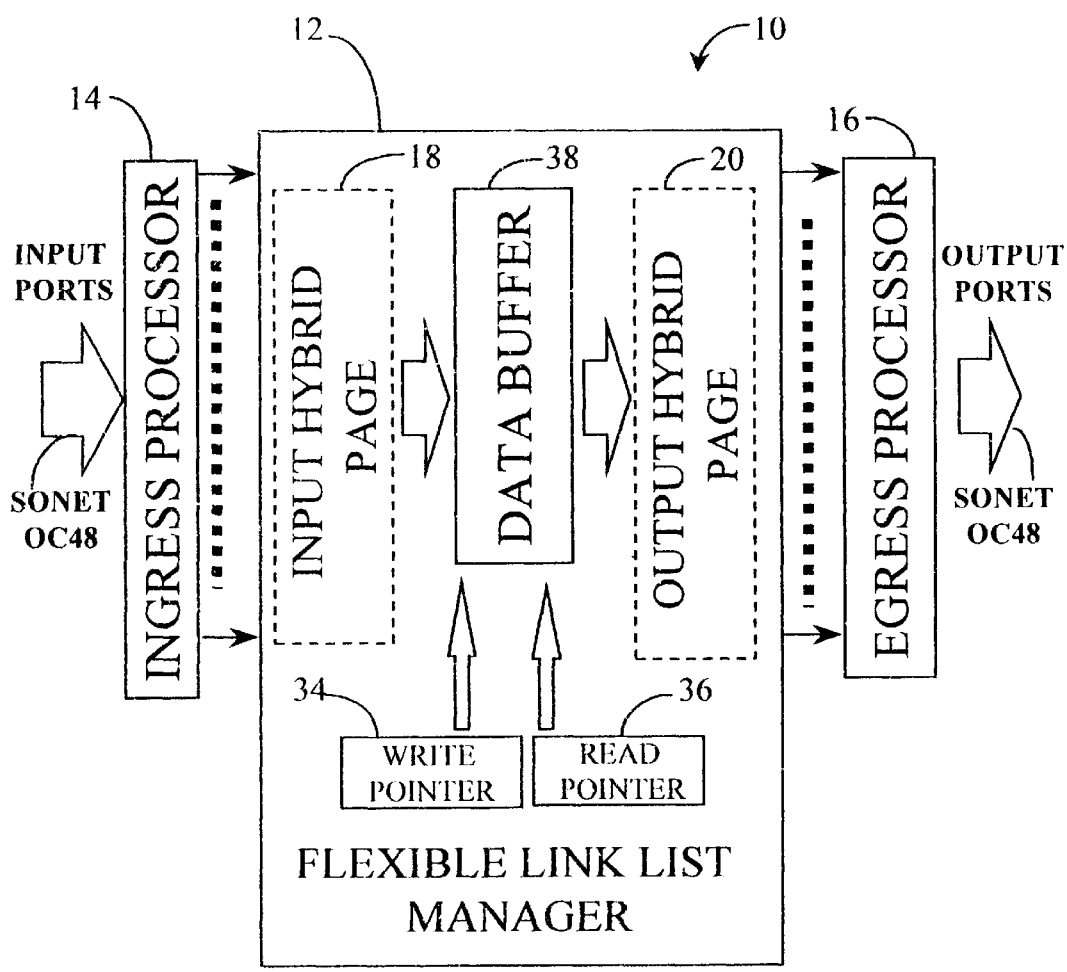
FIG. 1 is a block diagram which illustrates the connection of a flexible link list manager in a data path.

In the description which follows, like reference numerals are used throughout the written specification and several views of the drawing to indicate like or corresponding parts.

Referring now to FIG. 1, a switch 10 according to the present invention includes a flexible link list manager 12 connected between an ingress processor 14 and an egress processor 16. The flexible link list manager 12 maps ATM data and STM data from dedicated input links to dedicated output links. The ingress processor 14 provides conventional functions such as physical termination of the external links, performance monitoring functions, pointer processing for SONET links, cell delineation for ATM data and formatting the data to meet the internal link requirements. The egress processor 14 provides conventional functions including formatting internal links to external links and data integrity checking.

Figure 2:
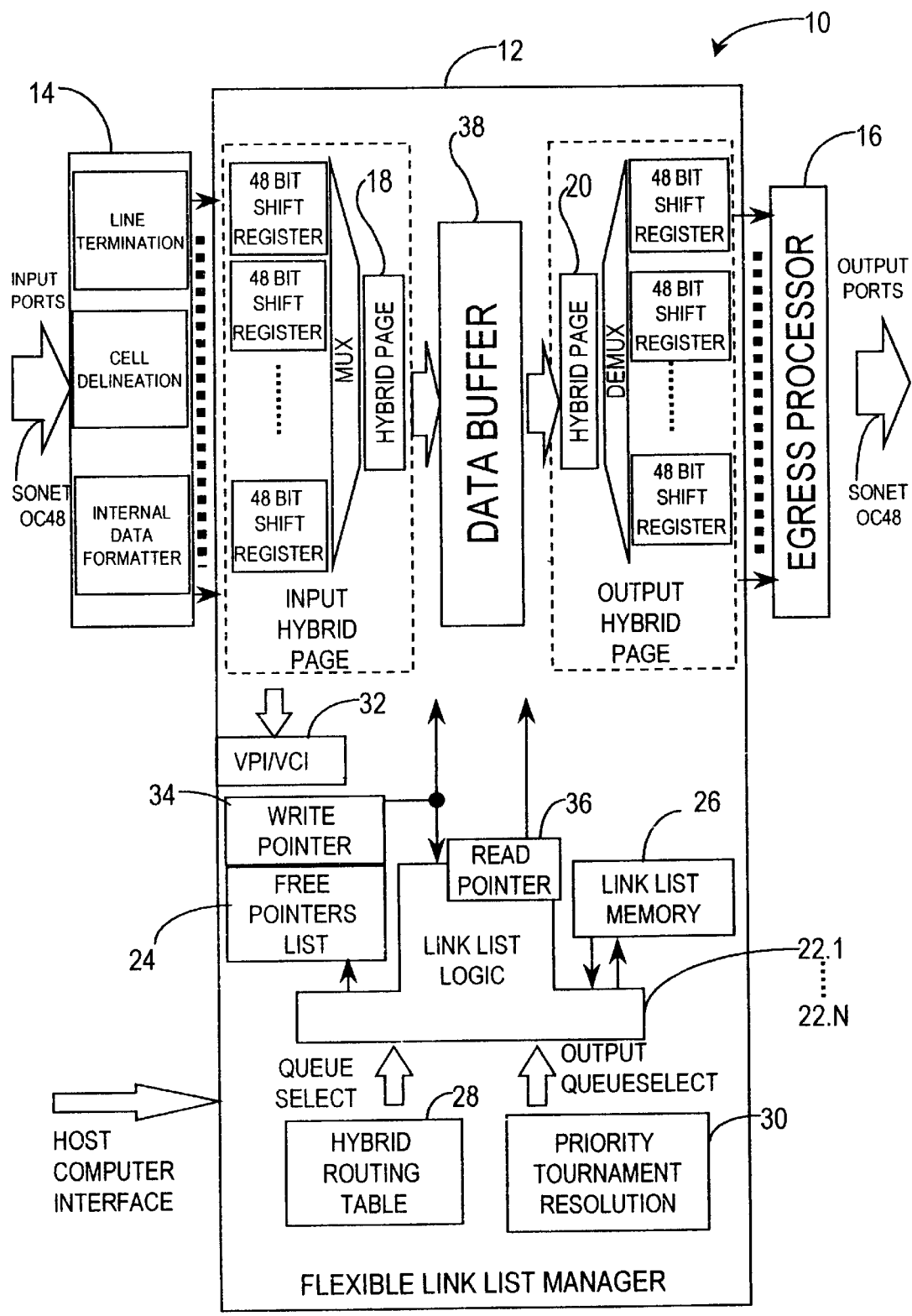
FIG. 2 is an expanded block diagram of the flexible link list manager of FIG. 1.

FIG. 2 shows an expanded block diagram of the flexible link list manager 12. In this exemplary embodiment, the external links are SONET OC48 coupled to the ingress and egress processors, respectively. Moreover, it is assumed that some of the 48 serial links carried by the SONET OC48 are configured and dedicated for transporting STM data and require STM switching, and some of the 48 serial links carried by the SONET OC48 are configured and dedicated for transporting ATM data and require ATM switching.

The main components of the flexible link list manager 12 include an input hybrid page random access memory 18, an output hybrid page random access memory 20, link list pointer registers 22.1, . . . , 22.N, a free pointers list 24, a link list memory 26, a hybrid routing table 28, a priority tournament resolution processor 30, a VPI/VCI table 32, a write pointer 34, a read pointer 36 and a random access data buffer memory 38.

Figure 3:
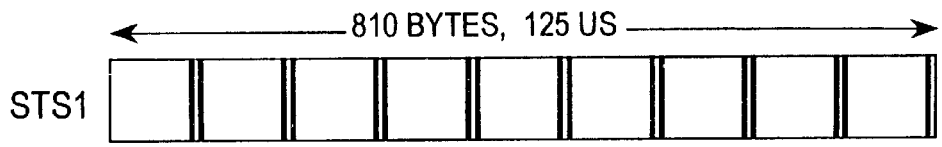
FIG. 3 illustrates the internal link format for STM traffic.
Figure 4:
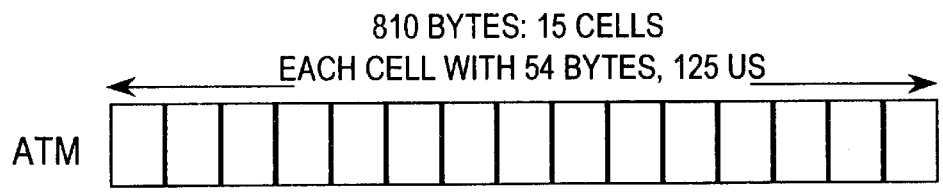
FIG. 4 illustrates the internal link format for ATM traffic.

The inputs to the flexible link list manager 12 are 48 serial links, at least one link being dedicated for STM traffic and at least one link being dedicated for ATM traffic, each link running at 51.84 megabits per second. Referring now to FIG. 3, the data format for an internal link, in the case of an STS1, includes a total of 810 bytes arranged in a time frame or segment of 125 microseconds. Referring to FIG. 4, the data format for an internal link carrying ATM cells is 15 cells, with each cell containing 54 bytes for a total of 810 bytes in a time frame of 125 microseconds. The ingress processor 14 staggers all of the internal links such that bit 0 of link 1 lines up on time with bit 47 of link 2, bit 46 of link 3, and so on through bit 1 of link 48. The input hybrid page 18 thus converts the serial links into a parallel link forty-eight bits wide such that at time "N" of that parallel link, forty-eight bits of link 1 appear, at time "N+1" forty-eight bits of link 2 appear, etc. and at time "N+47" forty-eight bits of link 48 appear.

Figure 5:
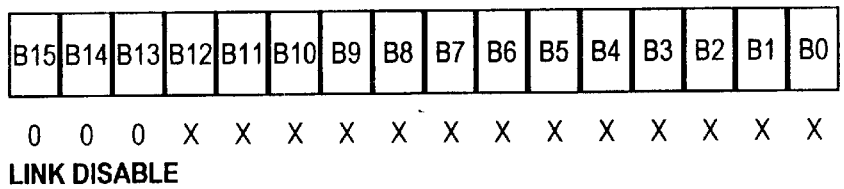
FIG. 5 illustrates data format after serial-to-parallel link conversion.
Figure 6:
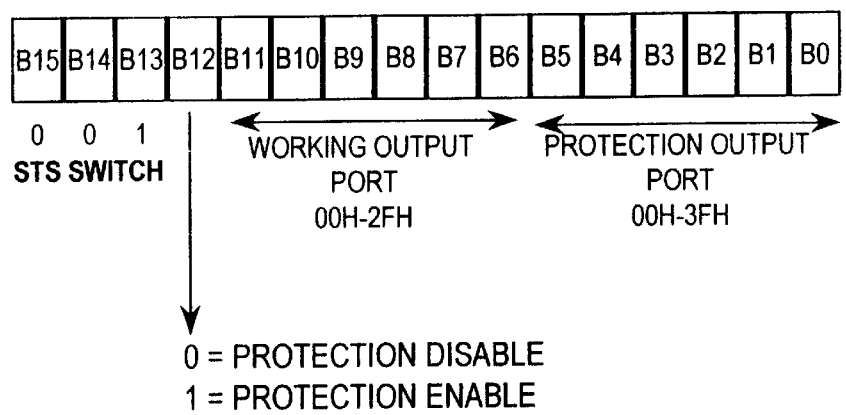
FIG. 6 illustrates the data format of the hybrid routing table for STM switch signal.
Figure 7:
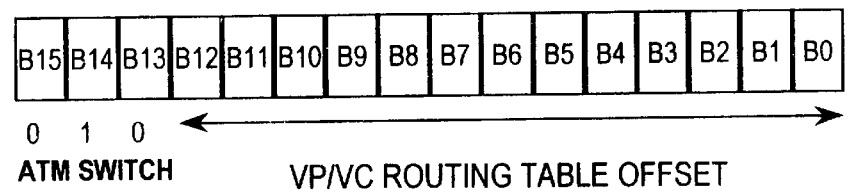
FIG. 7 illustrates the format of the VPI/VCI routing table offset data for an ATM switch signal.

FIG. 5, FIG. 6 and FIG. 7 show the data format after converting from serial links to parallel links. Data on the internal parallel links are written into the input hybrid page memory 18 such that at the end of 432 writes, 48 segments (one segment per link) appear in the hybrid page.

Referring now to FIGS. 8, 9, 10 and 11, and TABLE 1 and TABLE 2, the 48 segments in the hybrid input page memory 18 are passed to the output hybrid page 20 under the control of the hybrid routing table 28. TABLE 1 and TABLE 2 illustrate the values stored in the head of queue registers, tail of queue registers and link list memory as the link list is created. During this process, STM data switching takes place as well as ATM data switching and queuing. Upon leaving the input hybrid page 18, the following sequence of events takes place:

Step 1: Let us define time zero ($T_0$) the time when the first 48 bits of Link 1 leave the input hybrid page 18.

Step 2: At $T_0$, the hybrid routing table 28 reads entry one where routing information for link 1 resides. If this link is configured for STM switching, the destination port is read out of the hybrid routing table 28 as shown in FIGS. 5 and 6. If this link is configured for ATM switching, the destination port is read out of the VPI/VCI table 32 using the VPI/VCI offset (FIG. 7) to access it.

Step 3: At $T_0$, the free pointers list 24 is presenting pointer 0, P0, as the next available free buffer where data from the input hybrid page 18 may be stored. So, Link 1 is stored in P0.

Step 4: Since depth of queue at this time is zero, P0 is stored in the head of queue register 40 as well as the tail of queue register 42 associated with the output port and class of service selected in Step 2. The depth of queue register 44 is incremented to one.

Step 5: At $T_1$, the second set of 48 bits from Link 1 is stored in location P0+1.

Step 6: At $T_2$, the third set of 48 bits from Link 1 is stored in location P0+2.

Step 7: At $T_3$, the fourth set of 48 bits from Link 1 is stored in location P0+3.

Step 8: At $T_4$, the fifth set of 48 bits from Link 1 is stored in location P0+4.

Step 9: At $T_5$, the sixth set of 48 bits from Link 1 is stored in location P0+5.

Step 10: At $T_6$, the seventh set of 48 bits from Link 1 is stored in location P0+6.

Step 11: At $T_7$, the eighth set of 48 bits from Link 1 is stored in location P0+7.

Step 12: At $T_8$, the ninth set of 48 bits from Link 1 is stored in location P0+8.

Step 13: At $T_0$, 48 bits of Link 2 leave the input hybrid page 18.

Step 14: At $T_9$, the hybrid routing table 28 reads entry 1 where routing information for Link 2 resides. If this link is configured for STM switching, the destination port is read out of the hybrid routing table as shown in FIGS. 5, 6 and 7. If this link is configured for ATM switching, the destination port is read out of the VPI/VCI table 32 using the VPI/VCI offset to access it.

Step 15: At $T_9$, the free pointers list 24 is presenting pointer 1, P1, as the next available free buffer where data from the input hybrid page 18 may be stored. So, Link 2 is stored in P1.

Step 16: Since depth of queue at this time is zero, P1 is stored in the head of queue register 40 as well as the tail of queue register 40 associated with the output port and class of service selected in Step 14. The depth of queue register 44 is incremented to one.

Step 17: at $T_{10}$, the second set of 48 bits from Link 1 is stored in location P1+1.

The previous sequence repeats for all inputs with the following differences for ATM traffic where output contention may lead to a queue with depth greater than one:

Step 4.1: If depth of queue is greater than zero, at time T0, P0 is stored in the tail of the queue register 42 associated with the output port and class of service selected in Step 2.

Step 4.2: At the location pointed by the previous value of the tail of queue register, the value P0 is also stored.

Step 4.3: The depth of queue register 44 is incremented by one.

Figure 8:
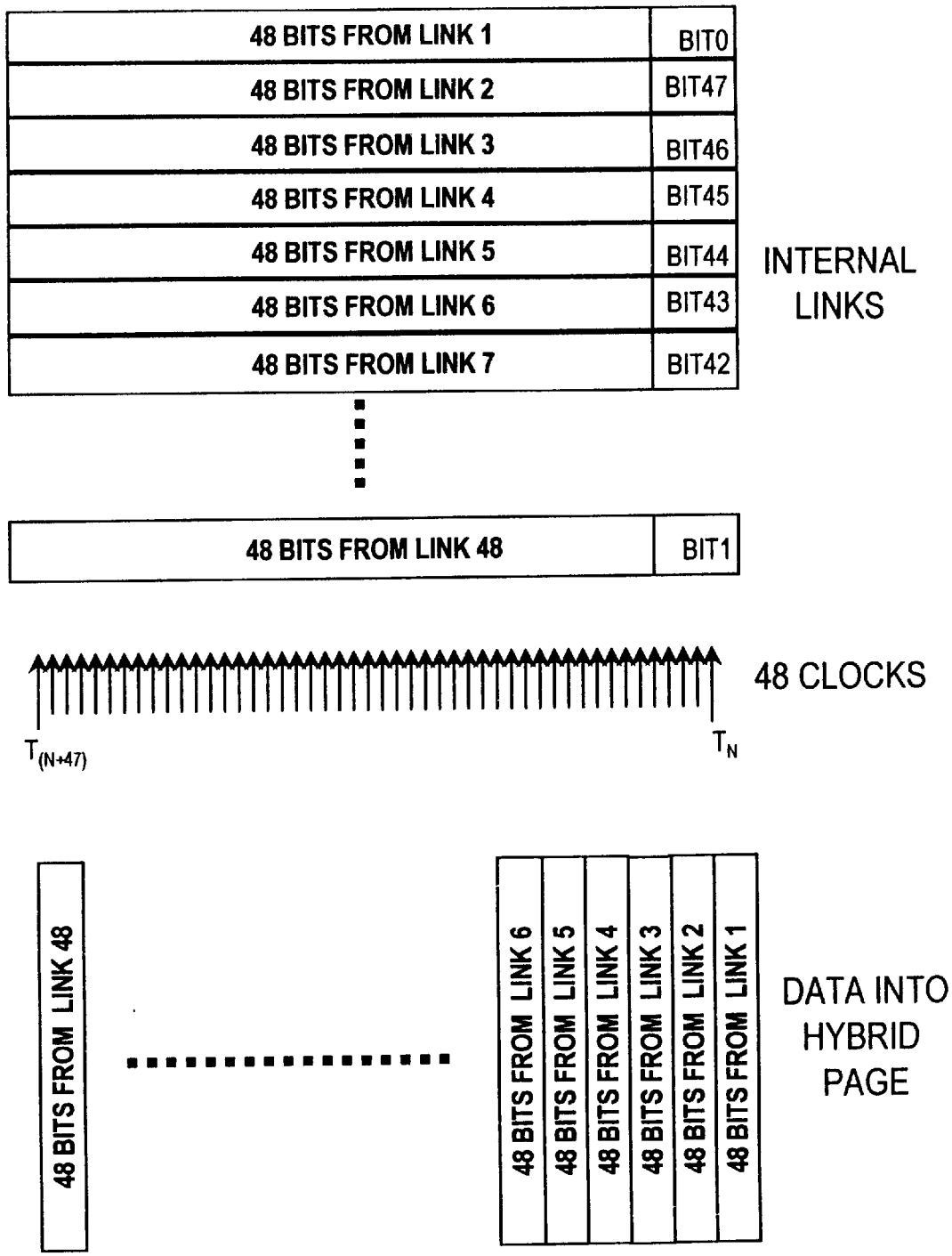
FIG. 8 is a block diagram which illustrates serial-to-parallel conversion in the input hybrid page.

FIGS. 8, 9 and 10 show the organization of data processing into and out of the link list manager 12. There is one link list per queue. The flexible link list manager 12 uses the head of queue registers of every output to operate the output hybrid page 20. Those output queues on which there is only one segment in the queue will be serviced without any other process. That is, the head of queue segment is chosen to be the output segment. For those outputs on which there is more than one queue, with multiple segments in it, then the segment of the highest priority must be selected. The process of selecting the most deserving segment is performed in the priority tournament resolution manager 30.

Output data is read out of the data buffer 38 sequentially. Each service window is long enough to service 48 links. During the first service interval, head of queue number 1 is used as the read address to the data buffer, and the segment read is the switched data from port N to output port 1. During the second interval, head of queue number 2 is used as the read address to the data buffer 38, and the segment read is the switched data from port M to output port 2. This process repeats until all ports are serviced and repeats again. For those outputs on which there is nothing in the queues, an idle segment will be generated. FIG. 12 and FIG. 13 show the format and flow of data in the output hybrid page 20.

As the queue is serviced, the queues are emptied. TABLE 2 shows an example of queue number 5 being emptied as it is serviced. Each output is serviced every 48 service intervals.

Referring to FIG. 2 and FIG. 3, segments stored in the output hybrid page 20 are de-multiplexed in order to generate internal links. At this point, 48 serial links are generated and sent to the egress processor 16 where the formatting to the external links is performed in conformance with SONET OC48.

Data format from the input hybrid page 18 and to the output hybrid page 20 allows for scaling the switching subsystem. FIGS. 17, 18 and 19 show a method for scaling by using a pair of hybrid page combiners 46, 48. This method expands each segment into the data buffer 38 in the parallel domain so that more segments can be processed by the flexible link manager during the same time window. In FIG. 17, the throughput has doubled by using two hybrid page combiner modules.

The hybrid page combiner module takes a block of data 9 bytes wide by 9 bytes deep on the input side, and reformats the data such that on the output the 9 bytes wide shows a 9 bytes deep and the 9 bytes deep shows as the 9 bytes wide. FIGS. 18, 19 and 20 show the formatting process. Referring to FIG. 21, the byte-wise serial-to-parallel conversion and byte-wise parallel-to-serial conversion performed by the hybrid page combiner allows up to nine input hybrid page blocks and nine output hybrid page blocks to work in parallel such that one segment is written into or read from the data buffer 38 in one clock cycle.

An important aspect of any ATM switch is the priority tournament. This is the procedure by which contending cells for the same output ports are serviced, the available bandwidth to each queue is allocated as a percentage of the total bandwidth. In case of contention from every class of service, the minimum bandwidth is guaranteed. Class of service zero is different in the fact that its bandwidth is distributed evenly on the time domain. In other words, the appearances of class of service zero on the output port are space on time equally. FIG. 24 is a process diagram illustrating class of service contention resolution. Each queue is associated with a class of service and an output queue. A counter and an initial value are associated to every queue. Every queue generates a request as long as its counter greater than zero and the depth of queue is greater than zero. If this condition is not met, the queue is pulled out of the service routine.

Class of service zero is different in that the request is generated every time the counter is equal to the value, that way the appearances on the output port are equally spaced on time. The service routine allows every request to access the output port in a sequential fashion. As soon as the counter is exhausted that queue is taken out of the Tournament until every counter is exhausted. At that time, the counters are loaded again and the cycle repeats again.

For the purpose of explaining the concept, TABLE 3 illustrates an example in which 4 classes of service are contending in the tournament. Class of service zero has been configured with 20% of the bandwidth, so the value associated with counter 0 is 4. Upon each fifth switching interval, class of service zero is enabled. Class of service 1 has 46% of the bandwidth, class of service 2 has 21% of the bandwidth and class of service 3 has 13% of the bandwidth. The larger the counter, the greater the precision. The percentage allocated to every class of service excluding class of service zero is given by the value for each class of service divided by the sum of all values excluding class of service zero times one minus the percentage allocated to class of service zero.

Another aspect of the switch 10 is the ability to discard cells if congestion starts to occur. Discard must be done in an orderly manner such that class of service can be maintained. The flexible link list manager 12 supports head of queue discard and tail of queue discard per class of service. Tail of queue discard is the process on which a cell is not placed on any queue upon arrival. Head of queue discard is the process on which a cell is taken out of the queue buffer and the buffer is returned to the free list memory with no transmission of the cell on the output port.

Discard is triggered by crossing thresholds associated with every queue and the free pointer list. FIG. 25 illustrates the discard logic.

Every queue has a depth of queue counter associated with it. Reaching the discard threshold triggers the discard mechanism. To take full advantage of the share buffer architecture, the discard logic qualifies the threshold crossing on every class of service queue with the threshold crossing of the output port and the congestion indication.

Different levels of congestion may allow cell discard on certain classes of service only. And when congestion is triggered, only the offending ports and the offending class of service are penalized.

Since data buffers are grouped in a common pool, the free pointer list thresholds insure that no one port and class of service take too many or all the buffers, and in time of congestion only the offending queues are penalized.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

TABLE 1

| Time | Head Of Queue 5 | Tail Of Queue 5 | Link List Memory Address | Link List Memory Data | Depth of Queue Register 5 |
| --- | --- | --- | --- | --- | --- |
| $T_{-1}$ | X | X | X | X | 0 |
| T0 | Pointer O | Pointer O | X | X | 1 |
| T1 | Pointer 0 | Pointer 1 | Pointer 0 | Pointer 1 | 2 |
| T2 | Pointer 0 | Pointer 2 | Pointer 1 | Pointer 2 | 3 |
| T3 | Pointer 0 | Pointer 3 | Pointer 2 | Pointer 3 | 4 |
| T4 | Pointer 0 | Pointer 4 | Pointer 3 | Pointer 4 | 4 |
| T5 | Pointer 0 | Pointer 4 | Pointer 4 | X | 4 |

TABLE 2

| Time | Head Of Queue 5 | Tail Of Queue 5 | Link List Memory Read Address | Link List Memory Data | Queue #5 Depth 5 |
| --- | --- | --- | --- | --- | --- |
| $T_n$ | Pointer 0 | Pointer 4 | Pointer 0 | Pointer 1 | 4 |
| $T_n + 54$ | Pointer 1 | Pointer 4 | Pointer 1 | Pointer 2 | 3 |
| $T_n + (54*2)$ | Pointer 2 | Pointer 4 | Pointer 2 | Pointer 3 | 2 |
| $T_n + (54*3)$ | Pointer 3 | Pointer 4 | Pointer 3 | Pointer 4 | 1 |
| $T_n + (54*4)$ | Pointer 4 | Pointer 4 | Pointer 2 | Pointer 3 | 0 |
| $T_n + (54*5)$ | Empty | Empty | X | X | 0 |

TABLE 3

| Switching Interval | COS 0 Counter | COS 1 Counter | COS 2 Counter | COS 3 Counter | Output Port |
|---|---|---|---|---|---|
|  | Value = 4 | Value = 6 | Value = 3 | Value = 2 | X |
| T0 | Cnt = 4 | Cnt = 6 | Cnt = 3 | Cnt = 2 | COS0 |
| T1 | Cnt = 3 | Cnt = 6 | Cnt = 3 | Cnt = 2 | COS1 |
| T2 | Cnt = 2 | Cnt = 5 | Cnt = 3 | Cnt = 2 | COS2 |
| T3 | Cnt = 1 | Cnt = 5 | Cnt = 2 | Cnt = 2 | COS3 |
| T4 | Cnt = 0 | Cnt = 5 | Cnt = 2 | Cnt = 1 | COS1 |
| T5 | Cnt = 4 | Cnt = 5 | Cnt = 2 | Cnt = 1 | COS0 |
| T6 | Cnt = 3 | Cnt = 5 | Cnt = 2 | Cnt = 1 | COS1 |
| T7 | Cnt = 2 | Cnt = 4 | Cnt = 2 | Cnt = 1 | COS2 |
| T8 | Cnt = 1 | Cnt = 4 | Cnt = 1 | Cnt = 1 | COS3 |
| T9 | Cnt = 0 | Cnt = 4 | Cnt = 1 | Cnt = 0 | COS1 |
| T10 | Cnt = 4 | Cnt = 3 | Cnt = 1 | Cnt = 0 | COS0 |
| T11 | Cnt = 3 | Cnt = 3 | Cnt = 1 | Cnt = 0 | COS2 |
| T12 | Cnt = 2 | Cnt = 3 | Cnt = 0 | Cnt = 0 | COS1 |
| T13 | Cnt = 1 | Cnt = 2 | Cnt = 0 | Cnt = 0 | COS1 |
| T14 | Cnt = 0 | Cnt = 1 | Cnt = 0 | Cnt = 0 | COS1 |
| T15 | Cnt = 4 | Cnt = 0 | Cnt = 0 | Cnt = 0 | COS0 |
|  | | Load to 6 | Load to 3 | Load to 2 | |
| T16 | Cnt = 3 | Cnt = 6 | Cnt = 3 | Cnt = 2 | COS1 |

What is claimed is:

1. A switch for handling synchronous transfer mode (STM) digital data signals and asynchronous transfer mode (ATM) digital data signals, comprising:

at least two digital data input links, wherein at least one data input link is configured for handling data bits propagating synchronously in a serial stream and at least one data input link is configured for handling data bits propagating asynchronously in a serial stream;

an input memory page including an input memory and at least two input registers coupled to the input links for accumulating digital data segments each having an equal number of bits taken from each serial input link, respectively, and outputting the data segments in parallel format into the input memory;

a data buffer coupled to the input memory for storing the parallel format data segments;

at least two digital data output links, wherein at least one output link is configured for handling data bits propagating synchronously in a serial stream and at least one output link is configured for handling data bits propagating asynchronously in a serial stream;

an output memory page including an output memory and at least two output registers coupled to the data buffer for receiving parallel format data segments from the data buffer, accumulating the data segments in serial format, and outputting the data segments in serial format on predetermined ones of the digital data output links; and, a link list manager coupled to the data buffer for coordinating the flow of data into and out of the data buffer.

2. A switch as set forth in claim 1, the link list manager comprising a programmable memory for storing a link list logic table, a virtual path identifier/virtual channel identifier table, at least two output queues, and a routing table.

3. A switch as set forth in claim 1 further comprising a page combiner module coupled to the data buffer for performing byte-wise parallel-to-serial conversion of data stored in the data buffer.

4. A switch set forth in of claim 1 including two or more output queues, a head of queue register, a tail of queue register and a depth of queue register coupled to the link list manager for directing synchronous transfer mode digital data from the at least one STM data input link to at least one output queue of depth one, the at least one output queue of depth one being coupled to the at least one STM data output link.

5. A switch as set forth in claim 1 including two or more output queues, a head of queue register, a tail of queue register and a depth of queue register coupled to the link list manager for directing asynchronous transfer mode digital data from at least one ATM data input link to at least one output queue of depth one or more, the at least one output queue of depth one or more being coupled to the at least one ATM data output link.

6. A switch as set forth in claim 5, wherein the at least one ATM data link having a bandwidth, and including a priority tournament resolution manager for distributing the bandwidth among a plurality of classes of service.

7. A switch as set forth in claim 6, the plurality of classes of service being associated with on the at least one ATM data output link at equally spaced time intervals, provided that there is at least one ATM cell contending for said at least one ATM data output link.

8. A switch as set forth in claim 1, the link list manager including a priority tournament resolution manager for evaluating the at least one ATM data output link for class of service priority at time intervals based on at least a counter value.

9. A switch for handling synchronous transfer mode digital data signals and asynchronous transfer mode digital data signals, comprising:

at least two data input links including at least one input link dedicated for handling synchronous data and at least one input link dedicated for handling asynchronous data;

at least two data output links including at least one output link dedicated for handling synchronous data and at least one output link dedicated for handling asynchronous data;

an input memory page coupled to the at least two data input links, the input memory page including at least two shift registers for accumulating and multiplexing bytes of input data;

a data buffer coupled to the input memory for storing bytes of multiplexed input data;

an output memory page coupled to the data buffer and the at least two data output links, the output memory page including at least two shift registers for accumulating and demultiplexing bytes of multiplexed data;

a link list manager control circuit for coordinating the flow of data into and out of the data buffer, the link list manager control circuit including a look-up memory including a link list logic table, a virtual path identifier/virtual channel identifier table, a link list memory and a routing table coupled to the data buffer for storing mapping instructions to the at least two data output links;

a write pointer for writing data from the input memory page into the data buffer; and, a read pointer for directing data values from the look-up memory to the output memory page.

10. A switch as set forth in claim 9 wherein the synchronous transfer mode digital data are switched by sending the synchronous transfer mode digital data from the at least one of the synchronous data input links to at least one output queue.

11. A switch as set forth in claim 9 wherein the asynchronous transfer mode digital signals are switched by channeling at least one asynchronous transfer mode cell from one of the at least two data input links to at least one output queue, the at least one output queue being associated with the at least one asynchronous data output link and a class of service.

12. A method of switching asynchronous transfer mode data and synchronous transfer mode data in a single switch comprising the steps of:

receiving one or more streams of synchronous data on one or more serial input links;

receiving one or more streams of asynchronous data cells on one or mo re serial input links;

accumulating bytes of asynchronous data from each of the asynchronous input links;

accumulating bytes of synchronous data from each of the synchronous input links, each byte of synchronous data being equal to the byte size and time frame duration of the asynchronous data cells;

converting the synchronous data bytes and asynchronous data bytes into parallel format and storing the parallel format data in an input memory;

routing each segment to a selected output link based on information contained in a routing table;

storing asynchronous transfer mode cells contending for the same output links in at least one asynchronous transfer mode data buffer;

reading data from the at least one asynchronous transfer mode data buffer into the selected output link;

wherein the step of storing asynchronous transfer mode segments contending for the same output links includes operating a pointer on a common pool of buffers according to a first-in-first-out link list associated with at least a class of service; and, wherein the requests from every class of service are serviced sequentially for as long as an associated counter and depth of an associated queue are not zero.

13. The method of claim 12 wherein each class of service is placed out of a priority tournament resolution manager when an associated counter has counted down to zero.

14. The method of claim 12 wherein one class of service request is serviced periodically, every time an associated counter matches an associated value, and when a service routine grants access to the output port immediately.

* * * * *